United States Patent Office 2,989,462
Patented June 20, 1961

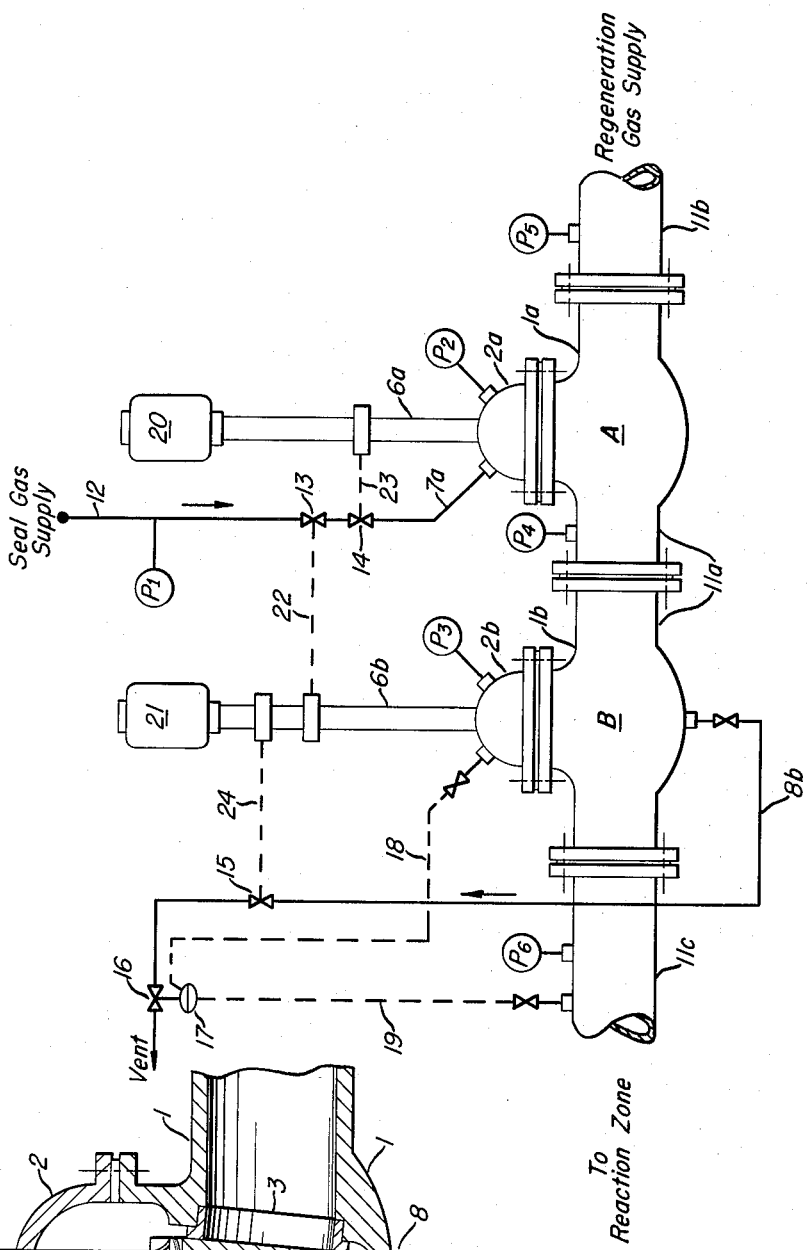

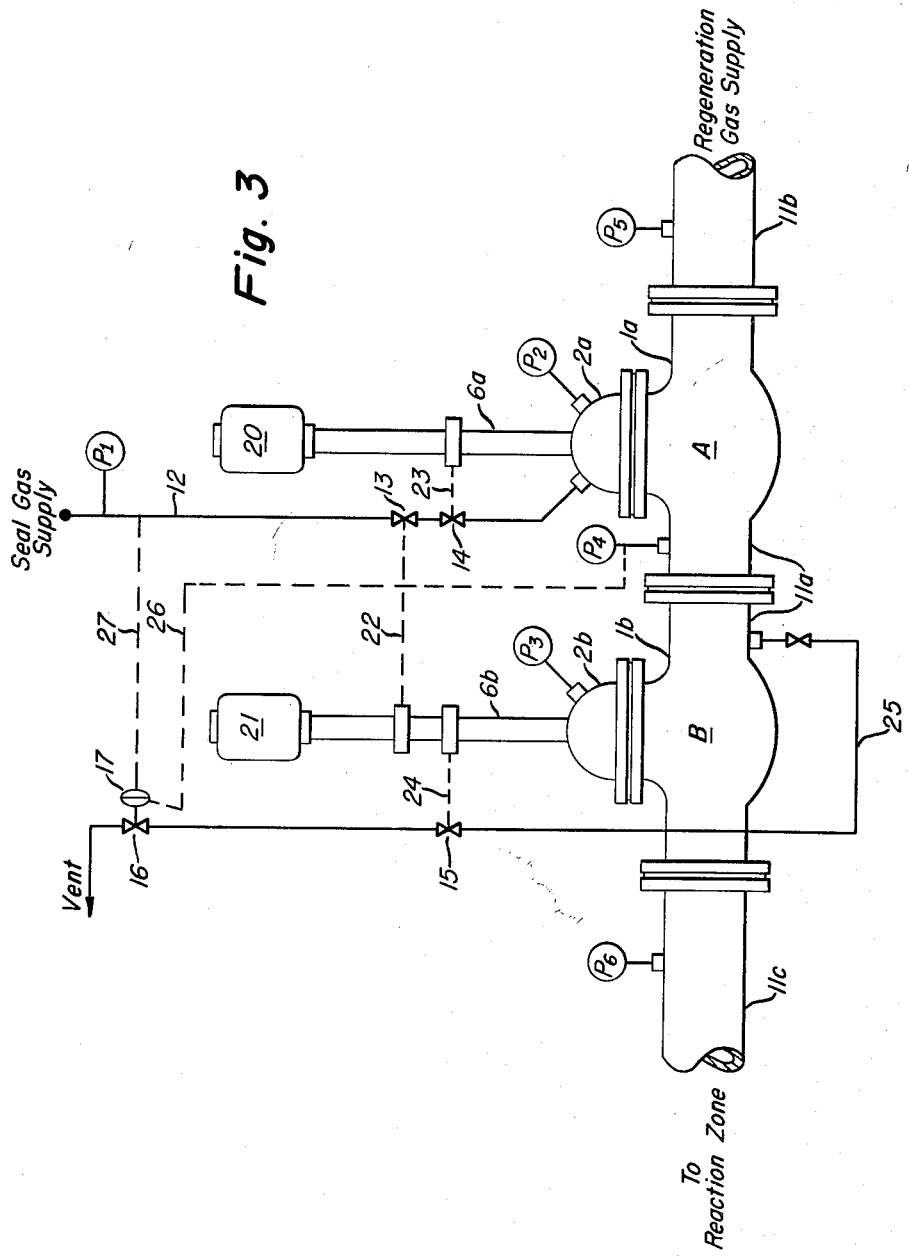

2,989,462
METHOD FOR SAFETY-SEALING VALVES

Manford R. Haxton, Texas City, Lyle M. Lovell, Dickinson, and Jesse L. Kitchens, Jr., La Marque, Tex., assignors, by mesne assignments, to Standard Oil Company, Chicago, Ill., a corporation of Indiana
Filed Oct. 31, 1958, Ser. No. 771,097
6 Claims. (Cl. 208—140)

This invention relates to regenerative platinum catalyst reforming and, more particularly, to an improved method for safety-sealing valves in the conduits connecting reaction zones with the regeneration-gas-supply zone so as to avoid explosion hazards and harmful leakage of flue gas into reaction zones.

In regenerative platinum catalyst reforming systems which include a plurality of reactors which are interconnected by lines and/or manifolds and the like, such as exemplified by Ultraforming (Petroleum Engineer, Vol. XXVI, No. 4, April 1954, at page C-35; Snuggs et al. U.S.P. 2,773,014, December 4, 1956) platinum-alumina catalyst in an isolated reactor is periodically reactivated by contact with oxygen-containing gases while reforming of naphtha vapors continues in the remaining reactors. Rapid switching of reactors is readily facilitated, and explosive contact of oxygen-containing gases and naphtha vapors is likewise prevented, by employing one or more flue-gas-sealed valves in each of the conduits, i.e., pipes, between the reaction zones and the source of oxygen-containing regeneration gases. When such valves are closed, oxygen-free flue gas is maintained in the bonnets of the valves at a higher pressure than the pressure on either side of the valves. Thus, if a valve disc fails to close or seat properly, or if, because of required mechanical tolerances, gas leaks between the valve disc and the seating surface, the resulting leakage will be leakage of flue gas and not hydrogen, hydrocarbons or oxygen-containing regeneration gases.

Unfortunately, while such safety-sealing removes the explosion hazard, the accompanying leakage of flue gas into the reaction zone, which is usually appreciable, e.g., 1 to 20 standard cubic feet of flue gas per barrel of reformer feed, causes catalyst deactivation and/or lower reformate yields. These deleterious effects have been variously attributed to the formation of carbon monoxide, water, methane, and/or carbon resulting from reduction, in the presence of hydrogen and platinum catalyst, of carbon oxides present in the flue gas. It is therefore an object of the present invention to provide an improved method of gas sealing valves with flue gas which avoids such problems and still prevents explosive intermixing of gases. It is another object, in a particular embodiment of the present invention, to accomplish these results even in the event of loss or interruption of seal gas pressure. These and other objects of the present invention will become apparent as the detailed description proceeds.

Our improved method of gas sealing valves is specific to installations wherein two valves are employed in series in the conduit or pipe between a reaction zone and the regeneration-gas-supply zone. In accordance with our improved method, pressure of oxygen-free flue gas in the bonnet of the valve adjacent to the regeneration zone is maintained substantially in excess of the pressure in both the regeneration-gas-supply zone and the reaction zone. As a result no potentially-explosive intermixing of reaction and regeneration gases is possible. At the same time, we also maintain pressure of oxygen-free flue gas in the bonnet of the valve adjacent to the reaction zone substantially equal to the pressure in the reaction zone. Thus, no pressure differential exists to cause valve leakage between the valve disc and the seating surfaces.

Flue gas for sealing valves in refinery equipment can be conveniently made available as the product of combustion of hydrocarbons in air. Moreover, in regenerative catalytic reforming systems a flue-gas generator is usually already provided to supply flue gas for reactor purging and for catalyst regeneration. Flue gas employed as valve sealing gas must, of course, be substantially oxygen-free, a condition readily attainable by proper adjustment of the hydrocarbon and air supply to the generator. Flue gas used to seal the valve adjacent to the regeneration-gas-supply zone should be provided at substantially higher pressure, i.e., a pressure differential of at least about 10 p.s.i., e.g., 10 to 30 p.s.i., than the pressure in the reaction zone or in the regeneration-gas-supply zone, whichever is the higher. Flue gas pressure in the bonnet of the valve adjacent the reaction zone is maintained at substantially the same pressure as the reaction zone, i.e., within at least about 5 p.s.i., by venting the bonnet via a differential pressure control valve, via a back-pressure-regulated vent valve, or the like.

In an advantageous embodiment of the present invention, the portion of the conduit between the valves, hereinafter termed the spool, which may be, or may include, part of the valve bodies, as will be apparent from the accompanying figures, is vented, rather than the bonnet of the valve adjacent the reaction zone. Spool pressure is accordingly maintained, usually by a differential pressure control valve on the vent, at a set differential below the pressure at which the seal gas is supplied to the bonnet of the valve adjacent to the regeneration-gas-supply zone. In normal operation, the pressure differential is set so that spool pressure is substantially equal to pressure in the reaction zone. Thus, should seal gas pressure fail partially or completely, both valves would still be substantially sealed, as hereinafter described in detail.

The invention will be more clearly understood from the following detailed description of several embodiments read in conjunction with the accompanying figures wherein:

FIGURE 1 is a simplified drawing of a typical gas-sealed flexible-wedge-type valve which may be employed in conjunction with the gas sealing method of the present invention;

FIGURE 2 illustrates the embodiment of the present invention wherein the bonnet of the valve adjacent to the reaction zone is vented; and FIGURE 3 illustrates another embodiment of the present invention wherein the spool is vented and the system is thereby protected against partial or complete failure of seal gas pressure.

Referring to FIGURE 1, a typical gate valve comprises a body body 1, bonnet enclosure 2, body rings 3 and 4, disc 5, and stem 6. The disc shown in FIGURE 1 is a flexible-wedge-type valve disc, which is used very advantageously in this type of service. The disc is usually manufactured so that an annular space is provided between the two faces of the disc. The resulting annular space provides a degree of mechanical flexibility to the disc which permits relatively tight sealing with a minimum of sticking. While the flexible-wedge-type disc may advantageously be employed in this service, it is to be understood that the present invention is not necessarily specific thereto, and other commercially-available valves, e.g., double disc valves, may also be employed. (See Catalog No. 53, Crane Co., 836 S. Michigan Avenue, Chicago 5, Illinois.)

Seal gas, i.e., flue gas, is introduced into the bonnet of the valve via inlet line 7. Alternatively, the seal gas may be introduced into the valve body via line 8. In either case, the seal gas surrounds the disc and may leak out, even when the valve is tightly closed, between the contacting surface of disc 5 and body rings 3 and 4, if a pressure differential exists between the bonnet and the conduits on either side of the disc.

While in this specification reference is made to maintaining seal-gas pressure in the valve bonnet, it is to be understood that such terminology has reference to pressure within the volume of the valve enclosed by bonnet enclosure 2 and the connecting volume of valve body 1 which surrounds valve disc 5 when the valve is closed. As pointed out previously, seal gas may be introduced into the valve bonnet via lines 7 or 8, and similarly the valve bonnet may be vented via lines 7 or 8, if desired.

Referring to FIGURE 2, two valves A and B, each being similar to the valve described in FIGURE 1, are shown when connected in accordance with one embodiment of the present invention. Valve bodies 1a and 1b are bolted together forming the portion of the conduit referred to herein as spool 11a. While spool 11a is thus formed by the conduit extensions of the valve bodies, it is to be understood that a separate conduit or pipe may also be connected between the valves. Valve A is connected to the regeneration-gas-supply zone via another portion of the conduit 11b, and valve B is connected to the reaction zone via the remaining portion of the conduit 11c. Flue gas is supplied to the bonnet of valve A via seal gas supply line 12, shutoff valves 13 and 14 and line 7a.

The bonnet of valve B is vented via line 8b, shutoff valve 15, and vent valve 16. Pressure in valve B may be controlled as shown in FIGURE 2 by a differential pressure controller 17, the pressure signals to which come via pressure line 18 from the bonnet of valve B and via pressure line 19 from conduit 11c. Alternatively, the pressure in valve B may be controlled by a back-pressure regulator (not shown) on vent valve 16.

In FIGURE 2, valves A and B are opened and closed by motors 20 and 21 respectively, which motors actuate valve stems 6a and 6b respectively. While the valves are thus indicated to be motor operated, it is to be understood that the method of the present invention is not necessarily specific to motor-operated valves but is also equally applicable to manually operated valves. When valves A and B are opened by motors 20 and 21, shutoff valves 13, 14, and 15 are simultaneously closed by control means 22, 23, and 24 respectively, said control means being automatically actuated by movement of the respective valve stems. The safety-sealing method of the present invention is, of course, employed only when valves A and B are closed. Pressure of the seal gas supply is indicated by $P_1$; pressure in bonnets of valves A and B are indicated by $P_2$ and $P_3$ respectively; and pressures in spool 11a and portions of the conduits 11b and 11c are indicated by $P_4$, $P_5$ and $P_6$ respectively.

When practicing the present invention, valves A and B are both closed, and flue gas is supplied at sufficient pressure $P_1$ via 12, 13, 14, and 7a so that pressure $P_2$ substantially exceeds, e.g., by about 20 p.s.i., pressures in conduits 11b and 11c, i.e., $P_5$ and $P_6$ respectively, whichever is the greater. At the same time, pressure in the bonnet of valve B, i.e., $P_3$ is maintained at the same pressure as in conduit 11c, i.e., $P_6$, by means of vent valve 16, which in FIGURE 2 is a differential pressure control valve, including pressure controller 17 and pressure signal lines 18 and 19.

Since $P_1$ and $P_2$ exceed all other pressures, any leakage in valve A will be leakage of flue gas from the bonnet of valve A. Thus, there is no possibility of explosive contact of hydrogen-hydrocarbons in conduit 11c and oxygen-containing gases in conduit 11b. Since $P_3$ is substantially equal to $P_6$, no pressure differential exists between the bonnet of valve B and conduit 11c. Thus, no deleterious leakage of flue gas from the bonnet of valve B into conduit 11c occurs. $P_3$ is equal to or, more normally, less than $P_4$; and $P_4$ is equal to or, more normally, less than $P_2$, depending upon the relative leakage rates at the valve discs on either side of spool 11a.

FIGURE 3 is similar to FIGURE 2 except that the line to vent valve 16, which in FIGURE 2 is represented by line 8b and vent valve B, is now represented as line 25 and vent spool 11a. Also, while vent valve 16 is still a differential pressure control valve, pressure controller 17 receives pressure signals via lines 26 and 27 corresponding to pressures $P_1$ and $P_4$, rather than signals via lines 18 and 19 corresponding to $P_3$ and $P_6$ as in FIGURE 2. When applying the method of the present invention to FIGURE 3, $P_2$ is still maintained in excess of both $P_5$ and $P_6$. $P_4$, however, is maintained at a set differential pressure below $P_1$, which differential is set and held constant by means of the differential pressure control vent valve so that $P_4$ is substantially the same as $P_6$ when $P_1$ is at normal seal gas pressure. Thus, so long as $P_1$ is at normal pressure, valve A is fully sealed, and substantially no flue gas can leak via valve B into conduit 11c, because no pressure differential exists across the valve disc.

If the seal gas supply pressure $P_1$ drops or fails completely, however, the method of the present embodiment still assures a satisfactory degree of safety and also prevents flue gas from getting into the reaction zone. Accordingly, upon loss of seal gas pressure $P_1$, pressure in spool 11a, i.e., $P_4$, which is already at a set differential below $P_1$ (and $P_2$), will drop below $P_6$. Under such circumstances, the only possible mixing of oxygen-containing gases from conduit 11b and hydrogen and hydrocarbons from conduit 11c would occur in spool 11a, which, of course, is vented. The amount of contact, if any, would be insignificant and not hazardous since any substantial pressure differential between $P_5$ and $P_4$ would have the tendency of sealing the disc of valve A against the seating surface adjacent spool 11a. Similarly, any substantial pressure differential between $P_6$ and $P_4$ would likewise have the tendency to seal the disc of valve B against the seating surface adjacent spool 11a. It is thus apparent that the present embodiment prevents flue gas from entering the reaction zone but also copes with any explosion hazard even if seal pressure is partially or completely lost.

While the present invention has been described herein with respect to a particular type of valve and a particular reforming system, it should be understood that it is equally applicable to other types of gas-sealed valves and other regenerative platinum catalyst hydrocarbon conversion systems. Various alternative arrangements and operating techniques will be apparent from the above description to those skilled in the art, and such alternatives are to be considered within the scope of the present invention.

Having described and illustrated the invention, what is claimed is:

1. In a regenerative platinum catalyst hydrocarbon conversion system comprising a reaction zone, a regeneration-gas-supply zone, and a conduit connecting said reaction zone and said regeneration-gas-supply zone, said conduit having two valves in series intermediate the extremities thereof, said valves when closed being safety-sealed with flue gas in the bonnets of the valves, such flue gas being capable of causing catalyst deactivation and/or lower product yields, the improved method of safety-sealing said valves which comprises maintaining pressure of flue gas in the bonnet of the valve adjacent said regeneration zone substantially in excess of the pressure both in said reaction zone and in said regeneration zone, and maintaining the pressure of the flue gas in the bonnet of the valve adjacent said reaction zone substantially equal to the pressure in said reaction zone, whereby explosive intermixing of oxygen-containing regeneration gases and hydrocarbons is prevented and leakage of flue gas into said reaction zone is minimized.

2. The method of claim 1 wherein pressure in the bonnet of the valve adjacent the reaction zone is maintained by venting the bonnet through a differential pressure controller set to hold pressure substantially at the pressure in said reaction zone.

3. The method of claim 1 wherein pressure in the bonnet of the valve adjacent the reaction zone is maintained by venting the bonnet through a back-pressure regulator set to hold pressure substantially at the pressure in said reaction zone.

4. In a regenerative platinum-alumina catalyst hydrocarbon conversion system comprising a reaction zone, a regeneration-gas-supply zone, a conduit connecting said reaction zone and said regeneration-gas-supply zone, said conduit having two gate valves in series intermediate the extremities of the conduit, the improved method of safety-sealing said gate valves when closed which comprises introducing flue gas into the bonnet of the gate valve adjacent said regeneration-gas-supply zone at a pressure substantially in excess of the pressure in both said reaction zone and in said regeneration-gas-supply zone, such flue gas being capable of causing catalyst deactivation and/or lower product yields, maintaining pressure in the portion of the conduit intermediate said two gate valves at a fixed differential pressure below the pressure at which said flue gas is introduced into the bonnet of said gate valve adjacent said regeneration-gas-supply zone, said fixed differential pressure being set so that pressure in said conduit intermediate said gate valves is substantially equal to the presure in said reaction zone.

5. The method of claim 4 wherein pressure in the conduit intermediate said gate valves is maintained by venting said portion of the conduit intermediate said gate valves through a differential pressure control valve set to hold pressure substantially at the pressure in said reaction zone.

6. In a regenerative platinum catalyst hydrocarbon conversion system comprising a reaction zone containing platinum catalyst, a regeneration-gas-supply zone, and a conduit means connecting said reaction zone and said regeneration-gas-supply zone, said conduit means having two valve means in series intermediate the extremities thereof, said valve means when closed being safety-sealed with flue gas in the bonnets of the valves, such flue gas being capable of causing catalyst deactivation and/or lower product yields, the improvement whereby potentially explosive intermixing of oxygen-containing regeneration gases and hydrocarbons is prevented and leakage of flue gas into the reaction zone is minimized, which comprises means for maintaining pressure of flue gas in the bonnet of the valve adjacent said regeneration zone substantially in excess of the pressure both in said reaction zone and in said regeneration zone, and means for maintaining pressure of flue gas in the bonnet of the valve adjacent said reaction zone substantially equal to the pressure in said reaction zone.

References Cited in the file of this patent
UNITED STATES PATENTS

| | | |
|---|---|---|
| 1,999,740 | Shmidt et al. | Apr. 30, 1935 |
| 2,200,310 | Thayer et al. | May 14, 1940 |
| 2,773,013 | Wolf et al. | Dec. 4, 1956 |
| 2,842,336 | Johnson | July 8, 1958 |
| 2,856,151 | Peters | Oct. 14, 1958 |